April 16, 1935.    H. S. BLACK    1,998,115
MODULATING SYSTEM
Filed June 27, 1934
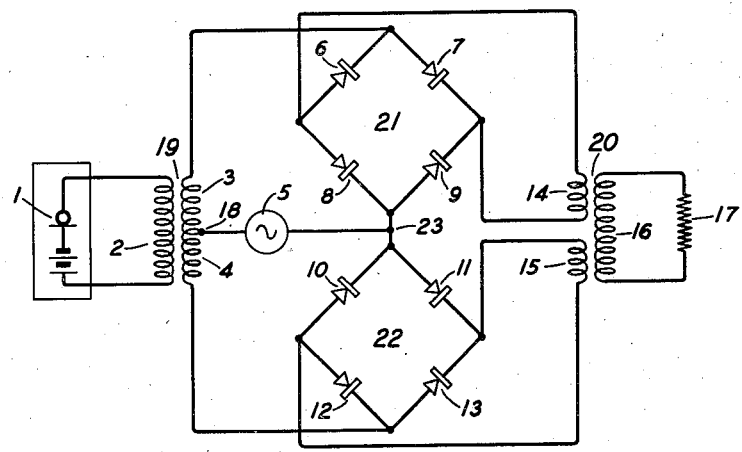
INVENTOR
H. S. BLACK
BY
ATTORNEY Patented Apr. 16, 1935

1,998,115

UNITED STATES PATENT OFFICE 1,998,115

MODULATING SYSTEM

Harold S. Black, Forest Hills, N. Y., assignor to Bell Telephone Laboratories, Incorporated, New York, N. Y., a corporation of New York Application June 27, 1934, Serial No. 732,591

3 Claims. (Cl. 179—171)

This invention relates to modulators, demodulators and detectors and more particularly to modulating systems in which a plurality of undesired currents are suppressed in the load circuit.

The main object of the invention is to improve the economy and reliability of modulating systems.

Another object is to increase the degree of suppression of the carrier and of unwanted currents in various portions of the system.

U. S. Patent 1,855,576, issued April 26, 1932, to C. R. Keith shows a modulating system providing for the suppression of harmonics in addition to the carrier and signal, thereby transmitting substantially sidebands alone. Other features therein include the provision of three mutually conjugate circuit branches and the adaptability of the system for simultaneous use as a modulator and a demodulator. Keith's arrangement utilizes balanced transformers, eight critically adjusted windings in all being required, together with four rectifiers which serve as modulating elements. In the present state of the art, transformers are expensive, particularly if the windings are balanced. On the other hand, rectifiers of the copper oxide type, for example, are cheap and efficient.

In accordance with the present invention, two bridge type modulators having four rectifiers apiece are combined with two transformers to secure the desired suppression. The number of critically adjusted windings is thereby reduced to four which more than offsets the cost of the additional rectifiers employed. The invention possesses all the above mentioned features of the Keith circuit in addition to greater simplicity and lower cost.

The invention will be more readily understood by reference to the drawing which discloses one embodiment of the invention in which three circuit branches are each balanced with respect to the other two by means of bridges composed of rectifier units. Because of the balanced relation of the component circuits a signal source may be applied to one branch, a source of carrier waves to another branch and a modulated current composed principally of the sidebands may be withdrawn from the third branch. The system comprises transformers 19 and 20 together with rectifier bridges 21 and 22. In the drawing the signal source is shown as a microphone 1 which is connected in series with a battery and winding 2 of transformer 19; the source of carrier waves is shown as a carrier frequency generator 5, connected between the common terminal 18 of windings 3 and 4 of transformer 19 and the junction point 23 of the two rectifier bridges; and the load 17 is connected to the transformer 20 comprising windings 14, 15 and 16. The two bridge networks comprise four rectifiers each, numbered from 6 to 13, inclusive. Any rectifying means may be used which has a higher resistance to currents in one direction than in the other, such as a copper oxide rectifier.

The conjugate relations of the circuit branches and the action of the network in producing modulated currents in transformer winding 16 when signal currents are impressed upon transformer winding 2 and carrier waves are impressed between the common terminal 18 of transformer windings 3 and 4 and the junction point 23 of the rectifier bridges will now be described.

Signal currents generated in transmitter 1 and flowing through transformer winding 2 will cause currents to flow in windings 3 and 4. Let it be assumed that the instantaneous value of this current is such as to make the upper terminal of winding 3 of negative potential with respect to the mid-point 18 and the lower terminal of winding 4 of positive potential with respect to mid-point 18. The potential difference between the terminals of winding 4 will cause current to flow from the lower terminal of winding 4 through rectifier 13, through transformer winding 15 in a direction from its inner towards its outer terminal, through rectifier element 10, and through carrier current generator 5 from right to left to the other terminal 18 of winding 4. Similarly, current will flow from the lower terminal 18 of winding 3, through carrier current generator 5 from left to right, rectifier element 9, transformer winding 14 in a direction from its inner terminal to its outer terminal, and rectifier element 6 to the upper terminal of transformer winding 3. Provided the transformer windings 14 and 15 are balanced and the currents are equal and opposite in direction as will be the case if the circuit is symmetrically constructed, no current will flow in transformer winding 16 and consequently in load 17, under this condition. Also, the currents described as flowing through generator 5 will be equal and opposite, resulting in no observable current through the generator. Also, if the instantaneous value of current is such as to make the upper terminal of winding 3 of positive potential with respect to mid-point 18 and the lower terminal of winding 4 of negative potential with respect to mid-point 18, the currents in windings 14 and 15 will still be equal and in opposite direction. Thus a positive potential at the upper terminal of winding 3 will cause current to flow through rectifier 7, through transformer winding 14 in a direction from its inner to its outer terminal, through rectifier element 8, and generator 5 to the other terminal 18 of transformer winding 3. Similarly current will flow from terminal 18 of transformer winding 4, through carrier current generator 5, rectifier element 11, transformer winding 15 in a direction from its inner to its outer terminals, through rectifier 12 to the lower terminal of transformer winding 4. Since these currents also traverse windings 14 and 15 in opposite directions and are equal in intensity, it is clear that they do not cause currents to flow in transformer 16 and load 17. The currents again neutralize each other in generator 5. Thus neither portion of signal wave is transmitted either to the load 17 or to the source 5.

In similar fashion, carrier currents from carrier current generator 5 are substantially balanced in transformer windings 14 and 15 and do not produce any current flow in transformer winding 16. This will be seen if it is first assumed that the instantaneous value of carrier current is such as to make the potential of positive value at the common terminal 18 of transformer windings 3 and 4 and of negative value at the point 23. In this case, current will flow from carrier current generator 5 through transformer winding 3 and in a direction from the mid-point 18 to the outer terminal, through rectifier element 7, through transformer winding 14 in a direction from its inner to its outer terminal, and through rectifier element 8 to alternating current generator 5. Current also flows from carrier current generator 5 to the mid-point 18 of windings 3 and 4 through transformer winding 4 to its outer terminal, through rectifier element 13, transformer winding 15 in a direction from its inner to its outer terminals, and rectifier element 10 to carrier current generator 5. The two currents produce equal and opposite magnetic effects in the windings 3 and 4, and again in the windings 14 and 15 and thus have no effect upon the windings 2 and 16.

If the instantaneous value of carrier current is such as to make the potential of negative value at the common terminal 18 of transformer windings 3 and 4 and of positive value at the junction 23, current will flow from generator 5 through rectifier 11, through transformer winding 15 in a direction from its inner to its outer terminals, through rectifier 12, through transformer winding 4 in a direction from its lower terminal to the common terminal 18 and thence to carrier current generator 5. Similarly current will flow from carrier current generator 5 to the point 23, though rectifier 9, through transformer winding 14 in a direction from its inner to its outer terminals, through rectifier element 6, through transformer winding 3 in a direction from its upper terminal to terminal 18 and thence to carrier current generator 5. Thus the impressed carrier has no effect upon the windings 2 and 16.

Inasmuch as signal and carrier waves are impressed jointly upon all the rectifiers, modulated waves arise in each rectifier and are transmitted to the transformer windings 14 and 15. These waves are combined in additive phase relation in the winding 16 and delivered to the load 17. In addition to the desired sidebands, various other modulation products are generated, some of which if not neutralized tend to distort the envelope of the modulated wave in the load. I find that those distortion products that are usually most prominent appear in phase opposition in the windings 14 and 15 and are neutralized. In particular, I find that harmonics of the signal and of the carrier are suppressed.

It is to be noted that the load 17 is conjugate to the signal source 1 and the carrier source 5, from which condition it is evident that either source may be made to change places with the load without disturbing the operation of the system. The conjugacy may be further demonstrated by supposing a voltage impressed across the winding 16 in such direction as to induce a current in the winding 14 from the inner to the outer terminal. The current will flow thence through the bridge 21 back to the inner terminal of the winding 14. The bridge being balanced, no current flows to either of the sources 1 and 5. The assumed voltage in the winding 16 will also induce a voltage in the winding 15 but no material current will flow because the rectifiers 10, 11, 12 and 13 are all opposed to the induced voltage and, in addition, the bridge 22 is balanced.

Assuming next that the voltage impressed across the winding 16 is reversed, the balanced bridge 21 and its component rectifiers oppose the voltage induced in the winding 14. The winding 15 induces a current in the bridge 22, which is conductive but balanced with respect to the sources 1 and 5. Thus it is immaterial in what manner the sources and the load are transposed, for the state of conjugacy among the circuit branches is unaffected thereby. Also the load circuit may be employed to impress an incoming modulated wave upon the rectifiers together with the carrier wave from the source 5 to reproduce signals in any receiving device located in the circuit of the transmitter 1.

What is claimed is:

1. A modulating system comprising two rectifier bridges, a signal source, a carrier source, and a load circuit, means to connect one source to both bridges in like phase, means to connect the other source to both bridges in opposite phase, and means to connect the load circuit to each bridge in a branch thereof that is conjugate to both sources, whereby harmonics are suppressed in the load circuit in addition to the carrier and signal waves.

2. A modulating system comprising two rectifier bridges, input and output transformers having three windings each, one winding of the input transformer being connected to each of the respective bridges, and one winding of the output transformer being connected in conjugate relation to the respective input transformer winding in each bridge, and a pair of terminals having connections to the two above mentioned input transformer windings in parallel, said connections and the third winding of each transformer constituting three mutually conjugate circuit branches.

3. In a modulator, two rectifier bridges connected together at a common corner, an input transformer having a divided secondary winding, a carrier source connected between the common bridge corner and the division point of said secondary, connections from the extremities of said winding to the respective bridge corners diagonally opposite the common corner, a signal source across the primary winding, and an output transformer with three windings, two of which are connected respectively across the remaining bridge diagonals, the third winding being connected to a load circuit.

HAROLD S. BLACK.